United States Patent [19]

de Mello et al.

[11] Patent Number: 4,463,306
[45] Date of Patent: Jul. 31, 1984

[54] SYSTEM FOR STABILIZING SYNCHRONOUS MACHINES

[75] Inventors: F. Paul de Mello, Burnt Hills; Louis N. Hannett, Hudson; David W. Parkinson, Burnt Hills; John S. Czuba, New York, all of N.Y.

[73] Assignee: Power Technologies, Inc., Schenectady, N.Y.

[21] Appl. No.: 301,445

[22] Filed: Sep. 11, 1981

[51] Int. Cl.³ .................................. H02P 9/30
[52] U.S. Cl. .................................. 322/25; 322/73; 323/204
[58] Field of Search .................. 322/19–21, 322/25, 26, 29, 31, 32, 58, 59, 73, 75; 323/258, 343

[56] References Cited

U.S. PATENT DOCUMENTS

| | | | |
|---|---|---|---|
| 3,662,251 | 5/1972 | Smith | 322/32 X |
| 3,999,115 | 12/1976 | South et al. | 322/25 |
| 4,245,182 | 1/1981 | Aotsu et al. | 322/20 |
| 4,326,159 | 4/1982 | Aotsu et al. | 322/19 |

*Primary Examiner*—A. D. Pellinen
*Attorney, Agent, or Firm*—Philip Young

[57] ABSTRACT

A microprocessor based, power systems stabilizer operating through excitation control wherein all required stabilizing information is derived from sampled values of voltage and current taken from potential and current transformers. The instantaneous values of terminal voltage and current are processed using algorithms in the accelerating power signal digital processor portion of the microprocessor to thereby develop a value of instantaneous internal voltage, the value of slip frequency of such voltages in relation to rated frequency and a digitally filtered value of electrical power. The accelerating power is calculated from the rate of change of slip and electrical power. The values of accelerating power are processed with digital algorithms in a stabilizing signal compute section of the microprocessor to yield a stabilizing signal which provides the desired modulating action for damping the machine oscillations of the synchronous generator. This modulating action is provided by switching the taps in an autotransformer being supplied from the potential transformer secondary measuring generator terminal voltage and feeding the voltage regulator and exciter for the generator. The selection of taps on the autotransformer is controlled by the microprocessor based stabilizer system at an appropriate rate, such as every one to ten milliseconds.

17 Claims, 13 Drawing Figures

FIG. 1  DIGITAL STABILIZER

ACCELERATING POWER
COMPUTE UNIT -86-

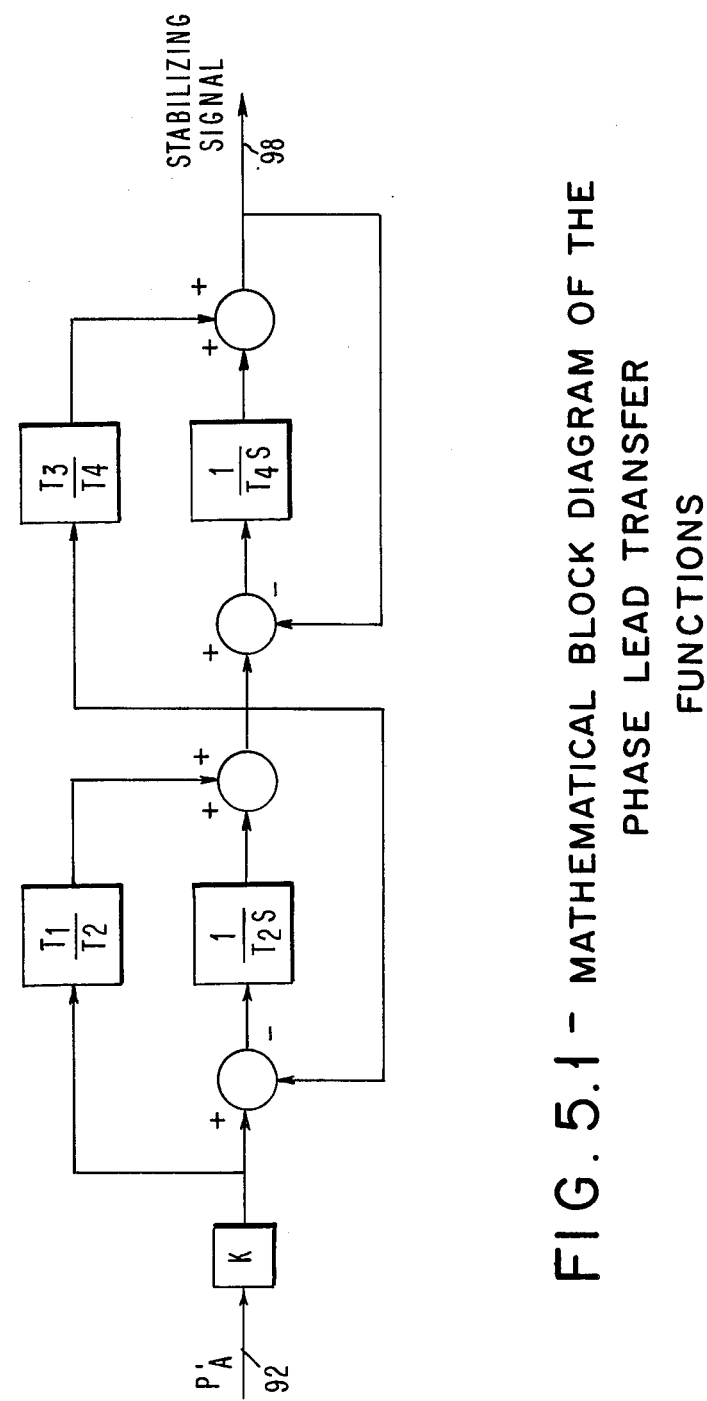
FIG. 5.1 — MATHEMATICAL BLOCK DIAGRAM OF THE PHASE LEAD TRANSFER FUNCTIONS

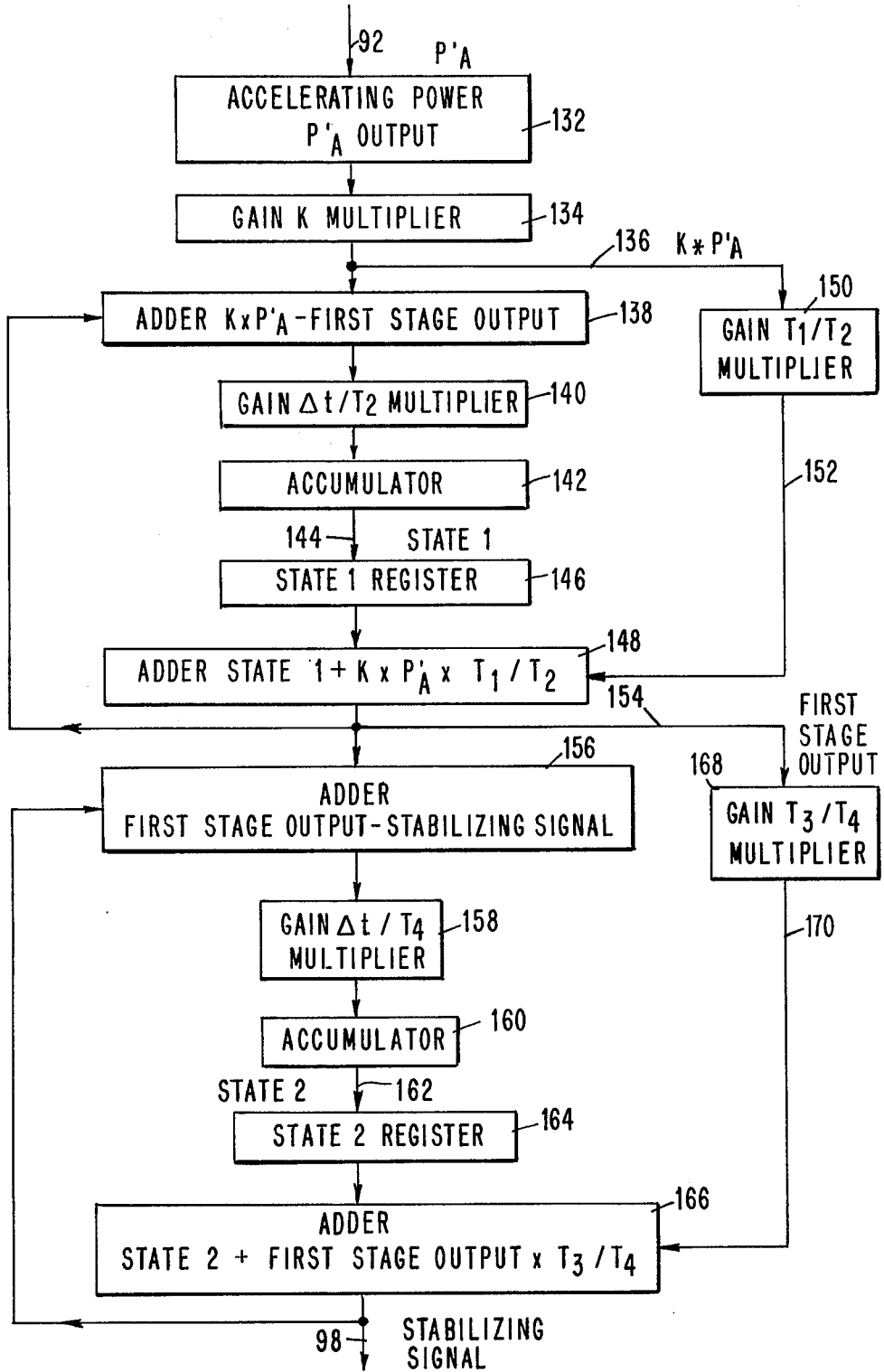
FIG. 5.2 STABILIZING COMPUTE UNIT 94

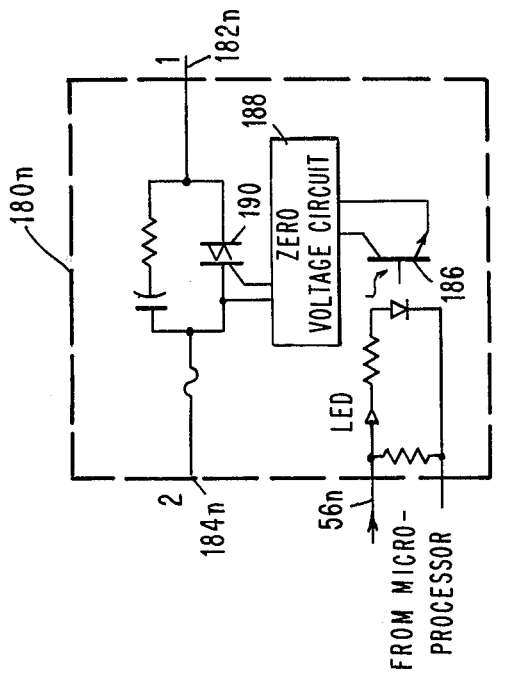
FIG. 6.2
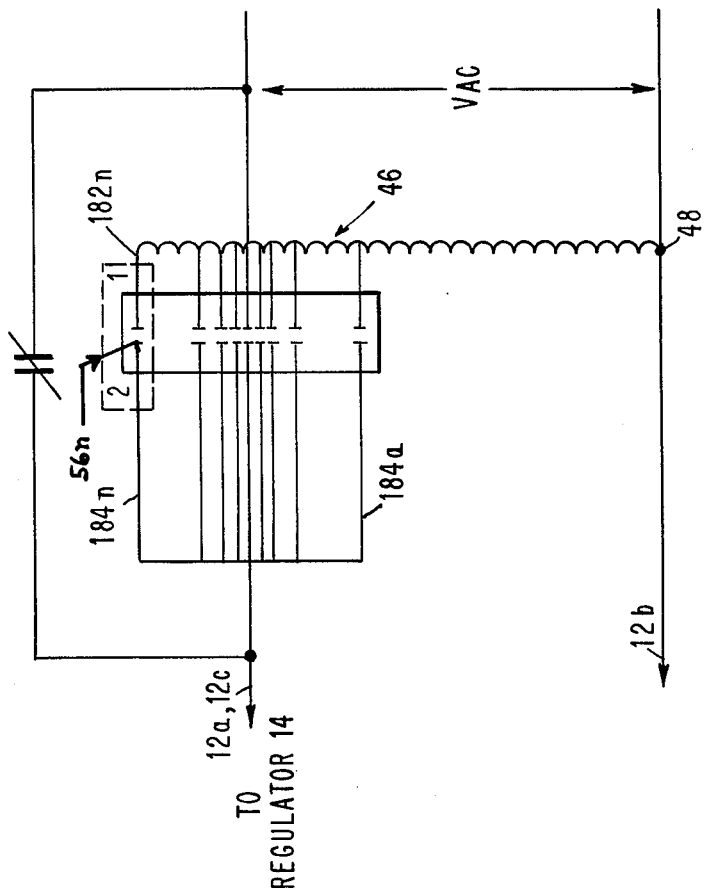
FIG. 6.1

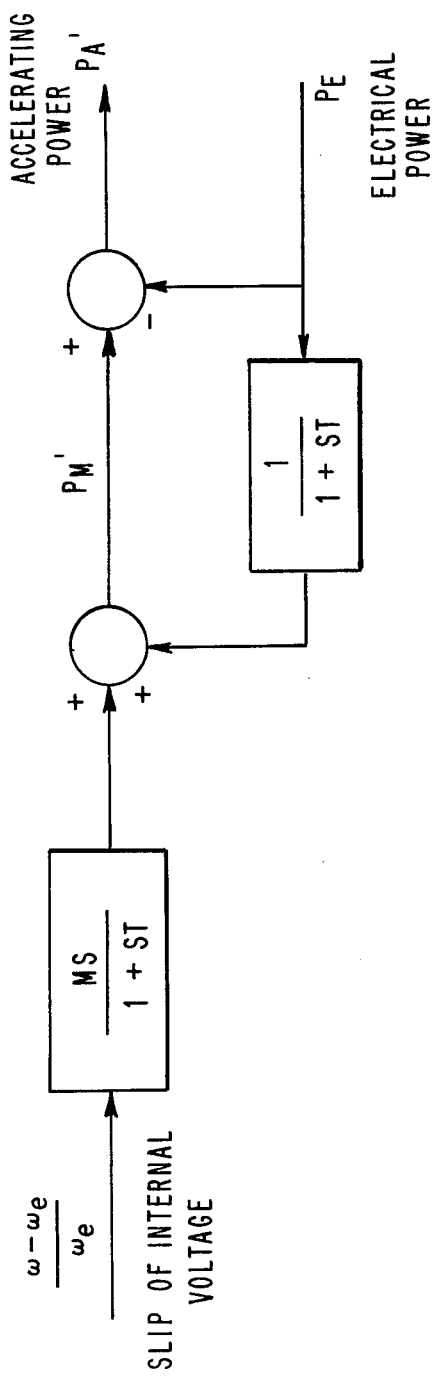
FIG.7 – MEASUREMENT OF ACCELERATING POWER (PRIOR ART)

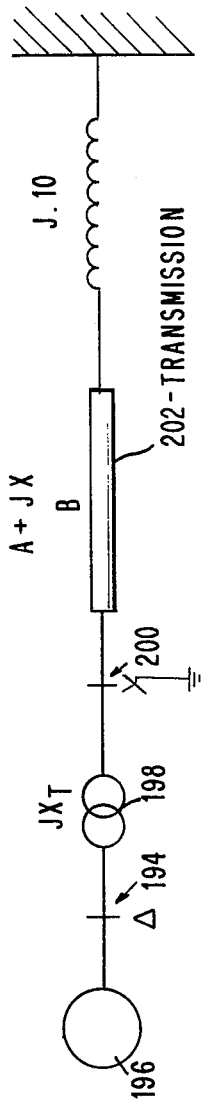
FIG. 8 SAMPLE SYSTEM (SIMULATED)
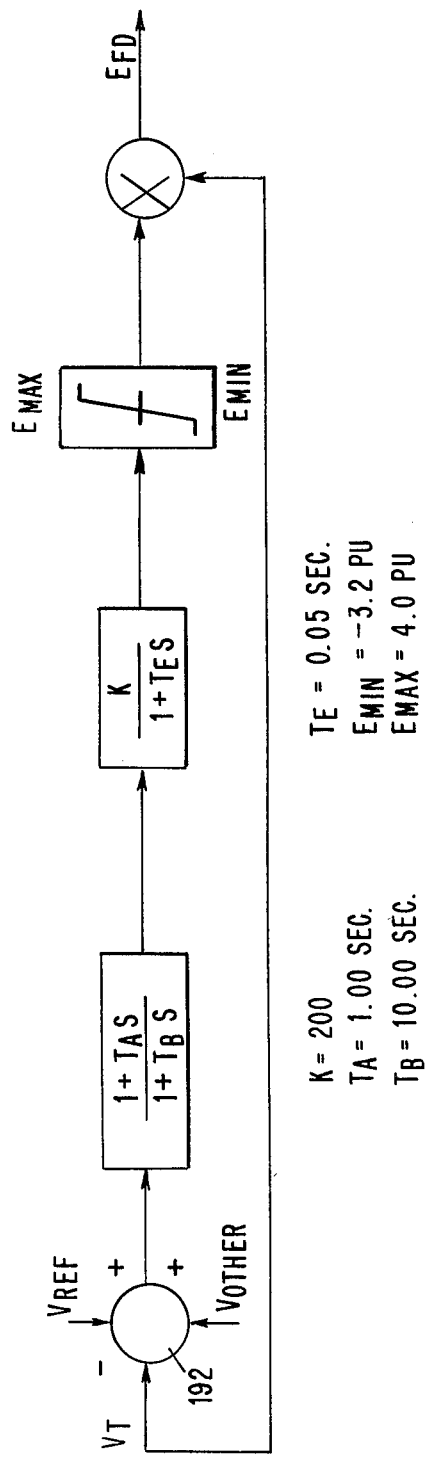
FIG. 9 HIGH INITIAL RESPONSE EXCITATION SYSTEM OUTPUT TO SLIP ALGORITHM CALCULATED
EVERY 10 ms.

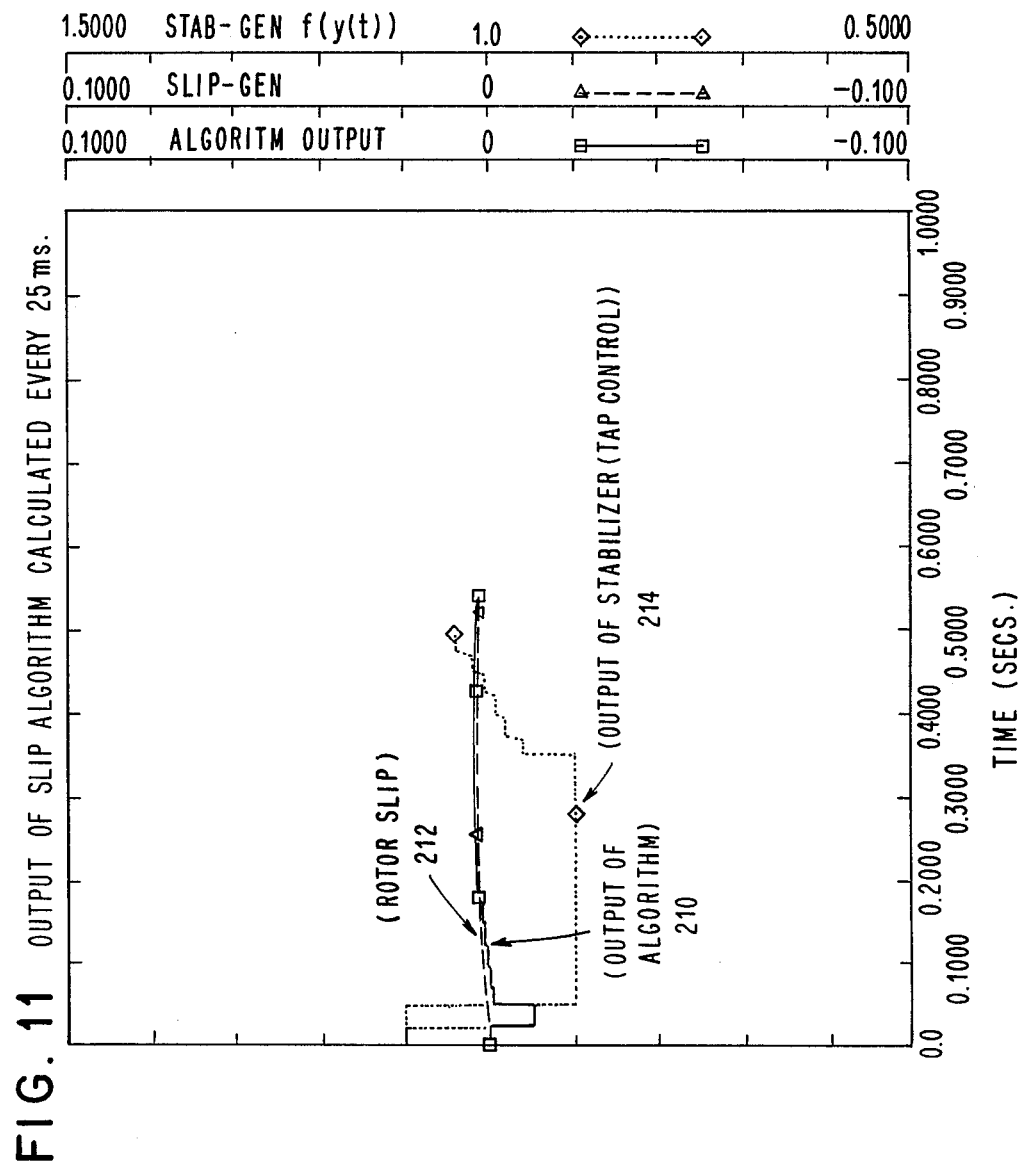

SYSTEM FOR STABILIZING SYNCHRONOUS MACHINES

TECHNICAL FIELD

The present invention relates to the stabilizing of synchronous machines, and more particularly to the damping of electro-mechanical oscillations in synchronous machines through excitation control and an automatic voltage regulator.

BACKGROUND ART

The role of excitation systems as a potential source of damping of power system electromechanical oscillations has been well established. The need for this source of damping as a stability aid has increased with the expansion of system interconnections and with the increasing trend towards more economical generator, i.e. higher reactance, designs and greater transmission loadings.

One problem associated with the development of optimum stabilizer designs for synchronous machines is that it is necessary to tailor the design stabilizer hardware to each individual excitation system.

In the supplementary stabilizing of synchronous machines through excitation controls, from an analytical point of view, the ideal variable to be used for derivation of a stabilizing signal is rotor speed. However, the difficulty of measuring rotor speed as well as the need to process such measurements through considerable lead functions to overcome the lags in the excitation system makes it more desirable to derive the stabilizing action from acceleration or accelerating power.

True accelerating power requires measurements of electrical as well as mechanical power. Recognizing that mechanical power is difficult to measure and that it generally does not exhibit variations in the bandwidth of significance for power angle oscillations, several successful applications of supplementary stabilizing have been made with the signal derived from electrical power rather than accelerating power.

Nevertheless, where substantial action can exist from governing, fast valving, manual or automatic generation control, a signal derived from electrical power alone can present problems. For instance, during rapid generation changes, through prime mover control action, a stabilizing signal derived from electrical rather than accelerating power will cause a temporary depression in voltage during periods of increases in generation. These effects make it desirable to use accelerating rather than electrical power for the supplementary stabilizing signal.

Several schemes have been proposed to measure accelerating power by deriving mechanical power through measurements of prime mover system variables, such as gate positions in the case of hydro units and steam pressures in the case of steam units. However, such schemes are impractical and require complex apparatus wherein masurement procedures are difficult.

In a paper entitled "Practical Approaches to Supplementary Stabilizing From Accelerating Power" by F. P. de Mello, L. N. Hannett and J. M. Undrill presented at the IEEE Power Engineering Society Summer Meeting in Mexico City, Mexico on July 17-22, 1977, IEEE Trans. paper F 77-524-2 (7 pages), there is proposed an approach for deriving mechanical power purely from the measurement of electrical quantities with a stabilizing action approximating that which would be ideally realizable from measured accelerating power. This approach derives all necessary information from terminal voltage and current of a generating unit as available from potential and current transformers. The method employs a watt transducer measuring electrical power output and a frequency transducer connected to measure the frequency of a voltage synthesized from terminal voltage and current to emulate a voltage whose phase angle follows the machine rotor angle. The stabilizing action is introduced as a modulation of the voltage feedback to a voltage regulator. This same approach for stabilizing of synchronous machines was previously set forth by the same authors of such IEEE article in a proposal by Power Technologies, Inc., the assignee of the present patent application, in December 1976 in the Company Bulletin PTI/84 (5 pages) entitled "System Stabilizer STB/1", wherein a general conceptual approach is described with the view to subsequent development of specific systems for investigating the described methods. The watt and frequency transducers, operational amplifiers and SCR modulator are proposed in such papers to form the accelerating power signal which is used to modulate the terminal voltage feedback to the voltage regulator.

In practically all applications of supplementary stabilization through excitation control, implementation has been with solid state analog components which receive the input signal from transducers and produce an analog signal fed into the reference of the automatic voltage regulator. In some cases, transducers are required and there is the possibility of interactions with shaft torsional modes. Also, stabilization signal adjustments are carried out with analog signals which are subject to drift or calibration problems. Such analog signal stabilizing action often involves changing the gain in the stabilizing network as a function of load level which is subject to inaccuracies and slower response times.

U.S. Pat. No. 3,474,323 to L. A. Kilgore et al discloses a stabilizing control means which is responsive to instantaneous changes in the real power output of the machine due to transient system disturbances and provides a signal which opposes and substantially cancels the action of the voltage regulator during such transient conditions. A firing circuit provides a phase modulated signal to produce an average AC potential and excitation current as determined by an error signal. The average excitation current maintains the output voltage of the generator at the desired regulated magnitude.

Various types of voltage regulating devices are known wherein digital control means are employed for switching the taps on a transformer. For example, U.S. Pat. No. 3,818,321 to Willner et al discloses a voltage regulator wherein a digital counter is used to control the selection of the tap-switch position on an autotransformer. Similarly, U.S. Pat. No. 4,105,964 to Lebedev et al discloses the use of an electronic commutator to control transformer tap selection in a voltage regulation and stabilization device, and the U.S. Pat. Nos. 3,515,980 to Throop and 3,898,568 to Barth disclose the use of counting and switching logic means for changing the taps on a transformer or an autotransformer. It would be desirable to develop a stabilizing system using digital switching and logic for synchronous machines without the disadvantages heretofore associated with such stabilizing systems.

It is an object of the present invention to provide a system for stabilizing a synchronous machine which does not employ analog components and transducers and does not operate with analog signals fed to the automatic voltage regulator of the machine. It is another object to provide a power system stabilizer which uses the modulation with appropriate response characteristics of the voltage feedback to an automatic voltage regulator preserving the normal signal level from potential transformers and therefore allowing its use on any type and vintage of voltage regulator. It is another object to provide a system for stabilizing a synchronous generator which does not employ analog measuring techniques or transducers and which eliminates the possibility of interactions with shaft torsional modes. It is another object to provide a system for stabilizing a synchronous machine wherein the hardware normally used to measure frequency from pulse counts between zero crossings is eliminated.

DISCLOSURE OF THE INVENTION

These and other objects are achieved by the present invention which provides a microprossor based power systems stabilizer operating through excitation control wherein all required stabilizing information is derived from sampled values of voltage and current taken from potential and current transformers. The instantaneous values of terminal voltage and current are processed using algorithms in the accelerating power signal digital processor portion of the microprocessor to thereby develop a value of instantaneous internal voltage, the value of slip frequency of such voltages in relation to rated frequency and a digitally filtered value of electrical power. The accelerating power is calculated from the rate of change of slip and electrical power. The values of accelerating power are processed with digital algorithms in a stabilizing signal compute section of the microprocessor to yield a stabilizing signal which provides the desired modulating action for damping the machine oscillations of the synchronous generator. This modulating action is provided by switching the taps in an autotransformer being supplied from the potential transformer secondary measuring generator terminal voltage and feeding the voltage regulator and exciter for the generator. The selection of taps on the autotransformer is controlled by the microprocessor based stabilizer system at an appropriate rate, such as every one to ten milliseconds.

BRIEF DESCRIPTION OF THE DRAWINGS

FIGS. 5.1 and 5.2 show the functional block diagram of the stabilizing signal compute unit shown in FIG. 3; FIG. 5.1 is the mathematical block diagram of the phase lead transfer function such as would be implemented in a continuous analog system; FIG. 52. shows the digital implementation which approximates the continuous function in FIG. 5.1 with values at discrete intervals of time;

FIGS. 6.1 and 6.2 are circuit diagrams of the autotransformer tap selector switch;

FIG. 7 is a general block diagram showing the relationships for prior art derivation of accelerating power from both the electrical power and speed;

FIG. 8 is a simulation drawing of a sample system provided with generator and system constants to illustrate the effectiveness of the stabilizer of the present invention;

FIG. 9 is a block diagram of a high initial response excitation system showing the parameters used for the stabilizer transfer function for assigning a value for the autotransformer tap ratio;

FIG. 11 is a graph showing the stabilizing signal output of the microprocessor in relation to rotor slip where the slip algorithm or sampling rate is calculated every twenty-five milliseconds.

BEST MODE FOR CARRYING OUT THE INVENTION

Figure 1:
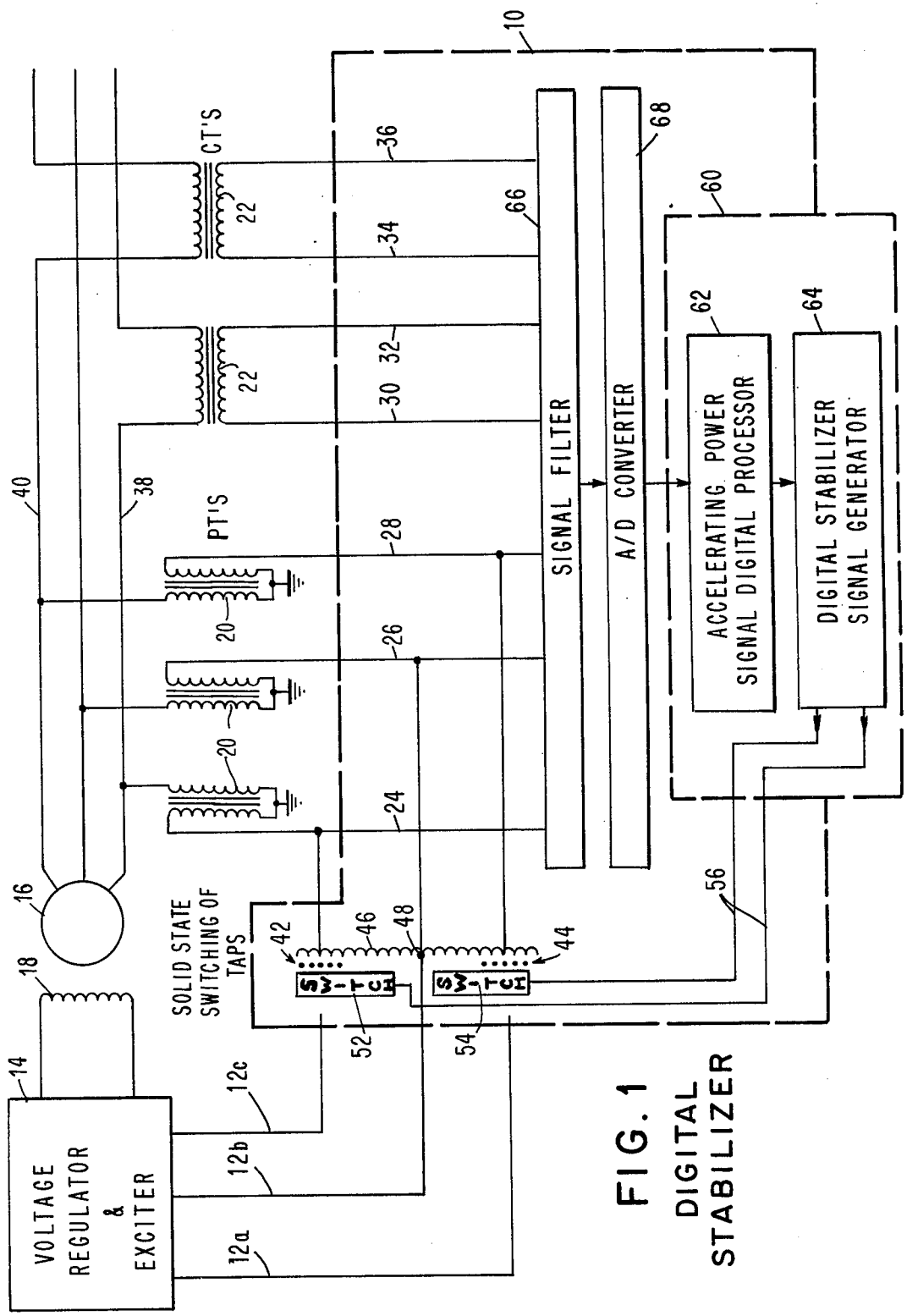
FIG. 1 is a circuit diagram showing the digital stabilizer connected to a synchronous machine through an automatic voltage regulator and exciter, illustrative of the present invention.

Referring to FIG. 1, there is shown a circuit diagram of the stabilizer system of the present invention. The stabilizer system is contained within the dashed line block 10 and is connected in series with the normal voltage feedback lines 12 to an automatic voltage regulator 14 which provides stabilizing action to a synchronous generator 16 through an exciter winding 18 by direct modulation of the AC voltage fed back to the automatic voltage regulator 14. Potential transformers 20 and current transformers 22 are connected to the synchronous generator 16 for obtaining input data for the stabilizer system 10. Inputs to the stabilizer system 10 are three leads 24, 26 and 28 from the potential transformer 20, and four leads 30, 32, 34 and 36 from current transformer 22 measuring two line currents on lines 38 and 40. Outputs from stabilizer system 10 are two voltages on lines 12a and 12c derived from taps 42 and 44 on an open delta autotransformer 46 and the common voltage 12b on the V junction 48 of the open delta. Selection of the taps 42 and 44 for connection to the output lines 12a and 12c is accomplished by solid state switches 52 and 54, such as optically isolated switches of the type OPTO-22 model OAC 5-A manufactured by Opto Corporation located in California, which receive digital inputs on lines 56 and 58 from a microprocessor 60. Microprocessor 60 is shown as comprising an accelerating power signal digital processor 62 and a digital stabilizer signal generator 64 to be described in detail.

Generally, the choice of the taps 42 and 44 on the autotransformer 46 is controlled by the microprocessor 60 which is provided with sampled values of voltages and currents measured by potential transformers 20 and current transformers 22. Signals to the solid state switches 52 and 54 are provided from the digital stabilizer signal generator 64 in microprocessor 60 at approximate intervals compatible with bandwidth requirements and the sampling rate of voltages and currents. This selection and switching of taps can, for example, be provided at one to ten millisecond intervals. The tap range is +10% with an exponential distribution yielding 0.25% taps around the mid range. Further details of switches 52 and 54 and autotransformer 46 are shown and described with reference to FIGS. 6.1 and 6.2.

Referring again to FIG. 1, a signal filter 66 receives the voltage and current signals from the potential transformer 20 and current transformer 22 and filters such signals to remove high frequency noise and also provides any suitable attenuation. Signal filter 66 may comprise a conventional filtering and attenuation circuit. An analog-to-digital (A/D) converter 68 receives the output of signal filter 66 and samples the values of voltages and currents from the transformers 20 and 22 and provides digitized sampled values for processing in the microprocessor 60. A/D converter 68 may comprise a conventional device suitable for the purposes described herein. The digitized data from A/D converter 68 is processed by the microprocessor including the accelerating power signal digital processor 62 and the digital stabilizer signal generator 64 to produce the desired stabilizer signal which is fed to the switches 52 and 54 for switching the autotransformer taps 42 and 44. This provides a stepwise modulation of the voltage feedback to the voltage regulator 14.

Microprocessor 60 includes circuits for processing, by the use of algorithms described below, the sampled input data to produce the digital stabilizing signals. In order to understand the operation of the microprocessor circuits for processing the sampled values of voltage and current, the operations of the microprocessor are shown by the flow diagram in FIG. 2, and circuit diagrams of the microprocessor are detailed and discussed in FIGS. 3 through 6.

Figure 2:
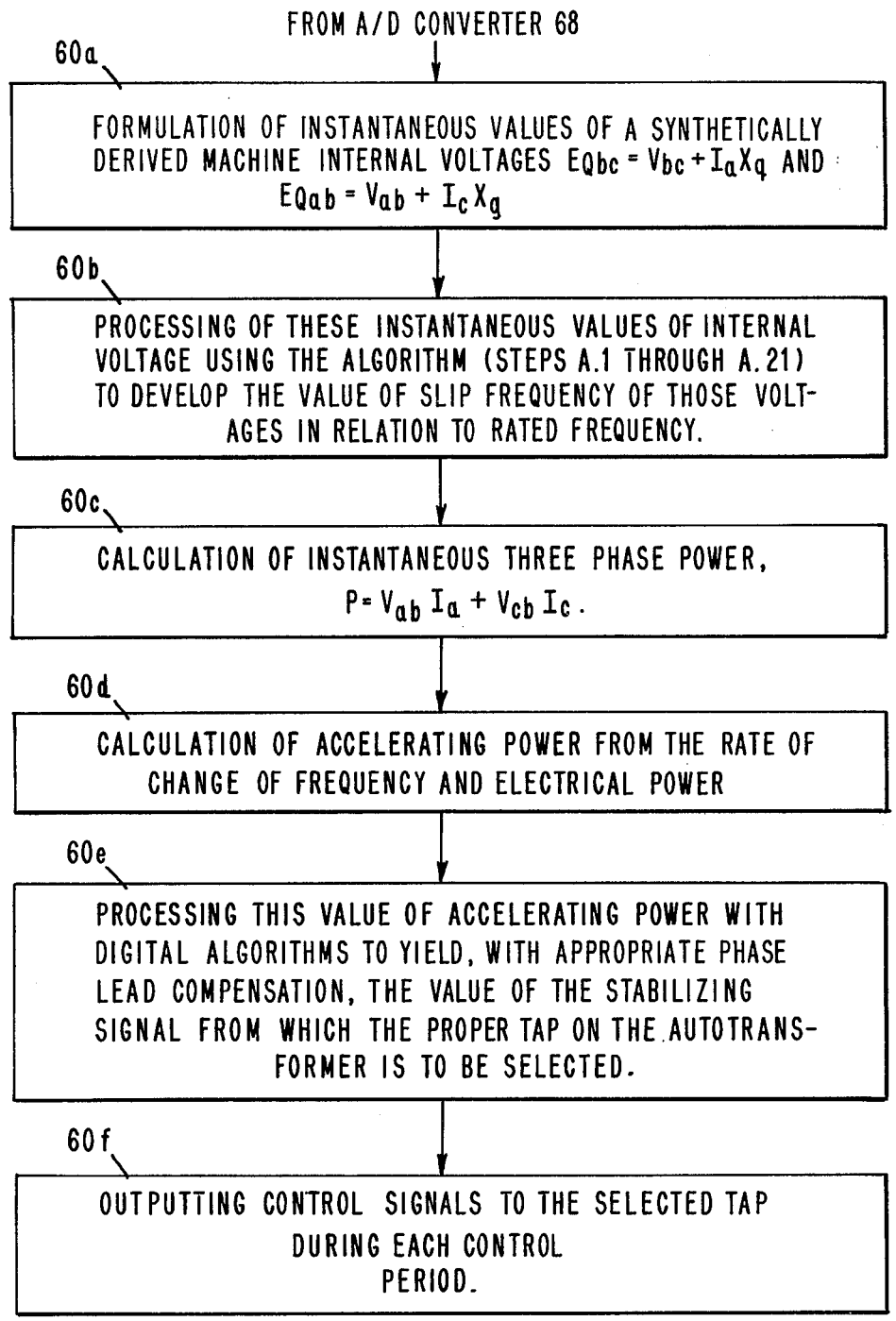
FIG. 2 is a system-flow diagram of the stabilizer operation illustrating the processing of sampled values of voltage and circuit to produce the stabilizing signals for selecting the appropriate autotransformer tap.

The processing of sampled values of voltage and current involve the following operations shown in FIG. 2.

(a) Formulation in block 60a of instantaneous values of a synthetically derived machine internal voltages $$E_{Qbc} = V_{bc} + I_a X_q \text{ and}$$

$$E_{Qab} = V_{ab} + I_c X_q.$$

(b) Processing in block 60b of these instantaneous values of internal voltage using the algorithm described in steps A.1 through A.21 below to develop the value of slip frequency of those voltages in relation to rated frequency.

(c) Calculation of instantaneous three phase power in block 60c, $$P = V_{ab} I_a + V_{cb} I_c.$$

(d) Calculation of accelerating power in block 60d from the rate of change of frequency and electrical power as shown and described with reference to FIG. 7.

(e) Processing this value of accelerating power with digital algorithms in block 60e to yield, with appropriate phase lead compensation, the value of the stabilizing signal from which the proper tap on the autotransformer is to be selected. The digital algorithm, used for processing of values of accelerating power, emulates an analog transfer function, such as the type set forth in equation (1) below.

(f) Outputting control signals in block 60f to the selected tap during each control period.

The processing of sampled values of voltage and current shown and described above with respect to the flow diagram of FIG. 2 is carried out in the preferred form by means of the microprocessor 60 which is designed to form the main functions of processing the signals to calculate the accelerating power and using the accelerating power value to generate a stabilizing signal from which the proper tap on the autotransformer 46 can be selected. These two general functions are preformed in the accelerating power signal digital processor 62 and the digital stabilizer signal generator 64 which are shown in greater detail in FIGS. 3-6 as a plurality of functional circuit components which constitute the microprocessor.

Figure 3:
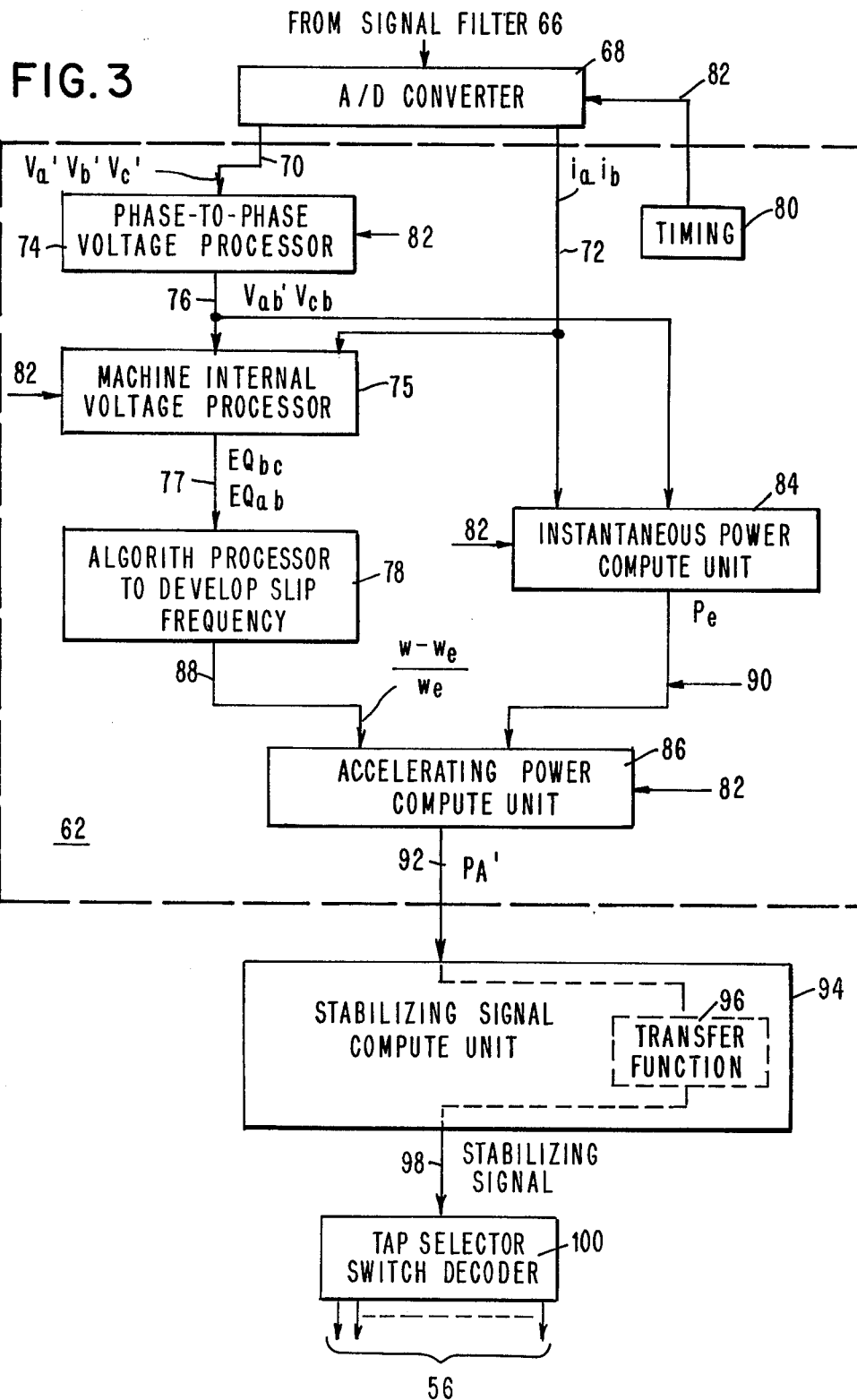
FIG. 3 is a functional block diagram of the system components for the microprocessor shown in FIG. 1.

Referring to FIG. 3, the sampled values of voltages and currents from the A/D converter 68 are shown on lines 70 and 72, respectively. The three phase to ground voltages $v_a$, $V_b$, and $v_c$ on line 70 are fed into the phase-to-phase voltage processor 74 to derive the instantaneous voltages $v_{ab}$ and $v_{cb}$ on line 76. The phase-to-phase voltages on line 76 and currents on line 72 are fed into the machine internal voltage processor 75 and the instanaeous power compute unit 84. The quantities $E_{Qbc}$ and $E_{Qab}$ on line 77, derived from the machine internal voltage processor 75, are fed into the algorithm processor 78. The value of slip frequency on line 88 in relation to the rated frequency $(\omega - \omega_e)/\omega_e$ is derived by using the algorithm described below with respect to equations A.1-A.21. The electrical power $P_e$ on line 90 is derived from the instantaneous power compute unit 84.

Both the slip frequency on line 88 and the electrical power 90 are fed into the accelerating power compute unit 86 to derive the accelerating power $P_A'$ on line 92. This calculation of accelerating power $P_A'$ is described below in connection with FIG. 7. The units 74, 75, 78, 84 and 86 constitute the accelerating power signal digital processor 62 as shown in FIG. 1.

Timing signals for sampling as well as other associated timing, such as for tap selection, is provided by timing circuits 80 on its output lines 82. While timing line 82 is shown as an input to only some of the circuit elements in FIG. 3, it should be understood that the appropriate timing signals are also provided in other circuits as is known in the state of the art.

The value of the accelerating power $P_A$, indicated on line 92, is processed in a stabilizing signal compute unit 94 using the digital algorithms described below in connection with equation (1) to provide a transfer function 96 as set forth in such equation. Transfer function 96 factors in the appropriate phase lead compensation to produce a stabilizing signal on line 98 which is converted in a tap selector switch decoder 100 into the appropriate digital code for causing the tap selector switch 52, 54 to make the appropriate tap connection. It is noted that timing means 80 is employed throughout the system for causing the sampling of values at the appropriate times and the tap selection to occur at appropriate intervals, such as every 25 milliseconds. In this fashion, a continuous voltage is at the voltage regulator 14 to be changed every 25 msecs in accordance with the output 56 from the autotransformer tap selector switch decoder 100 to the switch 52, 54.

Figure 4:
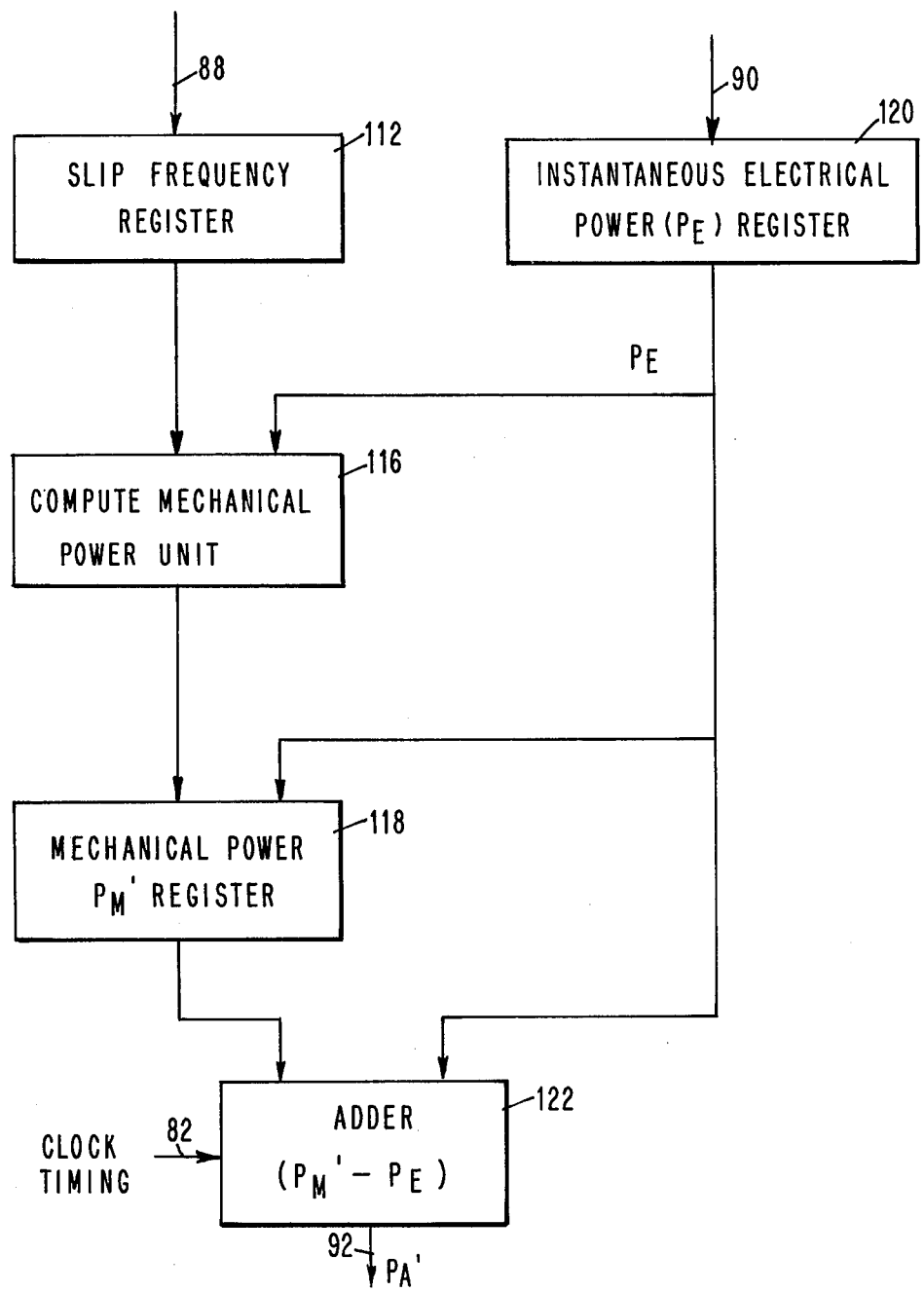
FIG. 4 is a functional block diagram of the accelerating power compute unit shown in FIG. 3.

FIG. 4 is a functional block diagram of the accelerating power compute unit 86 which receives both slip frequency signals from the algorithm processor 78 as well as values of the instantaneous power on line 90 from the compute unit 84. The slip frequency signals $(\omega - \omega_e)/\omega_e$ are stored in a slip frequency register 112. The output from register 112 is used with the electrical power $P_E$ on input line 90 in a compute mechanical power unit 116 to produce a value for the mechanical power $P_M'$ which is stored in a register 118. The instantaneous electrical power $P_E$ on line 90 is also stored in a register 120. The outputs of the registers 118 and 120 are subtracted digitally in an adder 122 to produce a resultant output $P_A'$ on line 92 representing the inferential measure of accelerating power described above. The relationships between the electrical power $P_E$, the mechanical power $P_M'$ and the accelerating power $P_A'$ are described in greater detail with respect to FIG. 7.

From an analytic point of view, the most consistent input signal to a stabilizer, in the sense that it always calls for the correct stabilizing action, is a rotor speed signal. However, the need to process this signal through sufficient "lead" to overcome lags of the excitation system and generator field makes it more desirable to derive the signal from accelerating power which is proportional to the rate of change of speed and, hence, has an inherent 90° phase lead relative to speed. The system of the present invention derives accelerating power from measurement of electrical power and the frequency of an internal voltage (q-axis) synthesized from terminal voltage and current, which frequency is approximately proportional to rotor speed. The derivation step is indicated by the method block 60d of FIG. 2.

FIG. 7 shows the basic principle used in composing a signal emulating accelerating power. Here, the relationship $P_A' = P_M' - P_E$ exists where $P_E$ = Electrical Power $P_M' = P_M (1/1+sT)$ = Mechanical Power Through a Small Lag T where T is the high frequency filter time constant and s is the Laplace transfer function $P_A'$ = Inferential Measure of Accelerating Power As indicated in FIG. 7, the inferred measurement of mechanical power $P_M'$ is obtained from electrical power, processed through a filter time constant T, and rate of change of speed also processed with the same filter time constant T. It should be recognized that omission of the input from speed in FIG. 7 reverts to the common application of electrical power through a rate washout.

The advantages of the scheme of FIG. 7 are:

(1) Mechanical power effects are included with very simple measurement from purely electrical quantities. Rotor speed can be derived from measurement of frequency of a synthetic voltage simulating the q-axis voltage ($E_q$) as described in the first method step (a) and indicated in block 60a in FIG. 2.

(2) The rate of change of speed measurement need not have the high frequency fidelity which is needed if speed alone were used for stabilizing in lieu of electrical power.

(3) There are no offset or additional rate washout functions required to drive the signal to zero in the steady state as would be required if mechanical power and electrical power were derived independently.

The key to the success of this method of deriving accelerating power is that the synthetic measure of mechanical power $P_M'$ derived from electrical power $P_E$ and rate of change of frequency does not require a high bandwidth on these inputs since mechanical power changes do not occur with high frequencies.

Additional functions may be provided which involve self-checking and diagnostics using two out of three voting logic to bypass the stabilizer and alarm in case of malfunction.

The disclosed system allows for a change in stabilizer gain as a function of load and also includes provision for a gain of zero for load levels below set values.

The digital algorithm described above emulates an analog transfer function operating on the inferred accelerating power $P_A'$ of the type:

$$\frac{y(s)}{P_A(s)} = \frac{K(1 + sT_1)(1 + sT_3)}{(1 + sT_2)(1 + sT_4)(1 + sT_5)} \quad (1)$$

with parameters adjustable where K is the gain multiplier, T1–T5 are the time constants (in seconds) and s is the Laplace transfer function.

FIG. 5.1 shows a mathematical block diagram of the phase lead transfer function such as would be implemented in a continuous analog system. The accelerating power $P_A'$ is provided on input line 92 which is scaled by a gain multiplier K. Other transfer function parameters include times T1, T2, T3 and T4 arranged with the adders and gain multipliers T1/T2 and T3/T4 shown in accordance with the phase lead transfer function. FIG. 5.2 shows the digital implementation which approximates the continuous function in FIG. 5.1 with values at discrete intervals of time.

The accelerating power $P_A'$ on input line 92 in FIG. 5.2 is stored in the accelerating power register 132. The accelerating power is then scaled by the gain K multiplier 134. The product on line 136 is again scaled by the gain $T_1/T_2$ multiplier 150 to produce $KP_A'T_1/T_2$ on line 152. This new product goes to the adder block 148 and it is added to STATE 1. The value for STATE 1 was stored in the STATE 1 register 146 at the last time when the stabilizing compute unit was activated. This sum on line 154 is called the first stage output and it is fed back to the adder in block 138 to form the difference of $KP_A'$ −First Stage Output. This difference is scaled by the gain $\Delta t/T_2$ in block 140. The scaled value is entered into the accumulator of block 142 for a new value of STATE 1 which is stored via line 144 in the STATE 1 register 146 for the next time when the stabilizing compute unit 94 is activated.

The first stage output on line 154 is scaled by gain $T_3/T_4$ multiplier in block 168. The product on line 170 is entered into the adder of block 166 with STATE 2 to form a sum which is the stabilizing signal on line 98. The value of STATE 2 was stored in the STATE 2 register block 164 at the last time when the stabilizing compute unit was activated. The stabilizing signal on line 98 is fed back to the adder 156 to form the difference with the first stage output. The difference, first stage output stabilizing signal, is scaled by the gain $\Delta t/T_4$ in multiplier block 158 and this product is entered the accumulator 160 to form STATE 2. The value for STATE 2 is stored via line 162 in the STATE 2 register 164 for the next time when the stabilizing compute unit is activated.

FIGS. 6.1 and 6.2 is a circuit schematic of either one of the optically isolated switches 52 and 54 connected to the autotransformer windings 46. Here, the digitally coded output on lines 56 from the tap selector switch decoder 100 are applied on the appropriate lines 56a through 56n shown in FIG. 6.2 to cause a closing of the appropriate switch portions 180a through 180n to the contacts 182a–n on one of the autotransformer legs 46 to the output line 184a–n.

As shown in FIG. 6.2 which represents the dotted line contact portion 180n shown in FIG. 6.1, the contact terminals indicated by numerals 1 and 2 are the same as the respective contact lines 182a through 182n and 184a through 184n, respectively. Similarly, the input lines 56 to the switch 52 is connected to each of the input lines 56a through 56n and such contact lines are connected to and the same as the lines 56 shown coming out of the tap selector switch decoder 100. In operation, the coded output from tap selector switch decoder 100 on lines 56 will cause a signal on a selected line of 56a through 56n of switch 180a–n and provide a signal through a transistor 186 and a zero voltage circuit 188 to cause a triac 190 to conduct so that there is conduction between points 1 and 2. Thus, one of the lines 182a–n will be connected to a contact point on the autotransformer 46 and switched through to point 2 of a corresponding line 184a–n for connection on output line 12a or 12c to the voltage regulator and exciter 14.

The effectiveness of the stabilizer scheme presented above was tested out by simulation on a sample system shown in FIG. 8. The generator and system constants used in this study are listed below in Tables I and II, respectively. The zero sequence parameters of the transmission line in relation to positive sequence (+) were assumed as: $R_o/R_+ = 6$; $X_o/X_+ = 3$; $B_o/B_+ = 0.6$. Here, a delta ($\Delta$) connection 194 is provided between the generator 196 and the step-up transformer 198, and a grounded wye (Y) connection 200 is provided between such transformer 198 and the transmission 202.

TABLE I

| SYSTEM CONSTANTS | |
|---|---|
| $X_T$ | = 0.10 PU (per unit) |
| $R_+$ | = 0.05 PU |
| $X_+$ | = 0.50 PU |
| $B_+$ | = 0.80 PU |

TABLE II

| GENERATOR CONSTANTS | | | |
|---|---|---|---|
| $L_d$ | = 1.600 PU | $T_{do}'$ | = 5.00 SEC |
| $L_d'$ | = 0.350 PU | $T_{do}''$ | = 0.06 SEC |
| $L_d''$ | = 0.200 PU | $T_{qo}'$ | = 0.80 SEC |
| $L_q$ | = 1.500 PU | $T_{qo}''$ | = 0.10 SEC |
| $L_q'$ | = 0.500 PU | H | = 4.50 |
| $L_q''$ | = 0.200 PU | | |
| $L_L$ | = 0.100 PU | | |

Here, $L_d$ is the direct axis inductance of the generator. $L_d'$ is the transient direct axis inductance. $L_d''$ is the subtransient direct axis inductance. $L_q$ is the quadrature axis inductance. $L_q'$ is the transient quadrature axis inductance. $L_q''$ is the subtransient quadrature axis inductance. $L_L$ is the leakage inductance. $T_{do}'$ is the direct axis transient open circuit time constant. $T_{do}''$ is the direct axis subtransient open circuit time constant. $T_{qo}'$ is the quadrature axis transient open circuit time constant. $T_{qo}''$ is the quadrature axis open circuit time constant. H is the inertia constant of the machine's rotor.

In this study the governor was not modeled, and the mechanical power remained constant.

FIG. 9 shows a block diagram of the excitation system. The stabilizing signal is fed into the exciter model at the first summing junction 192 as the signal labeled $V_{OTHER}$. The variable $V_{OTHER}$ is equal to $V_t(1-\text{Tap Ratio})$ so that the net input of the net average voltage AVR is ($V_{REF} - V_t$), where $V_t$ is a tap ratio voltage.

The parameters for the stabilizer transfer function given in equation (1) and as shown in FIG. 7 are listed below in Table III.

TABLE III

| STABILIZER TRANSFER FUNCTION PARAMETERS | | | |
|---|---|---|---|
| M | = 9 | $T_1$ | = 0.25 sec |

TABLE III-continued

| STABILIZER TRANSFER FUNCTION PARAMETERS | | | |
|---|---|---|---|
| T | = 0.20 sec | $T_2$ | = 3.00 sec |
| K | = 10 | $T_3$ | = 0.25 sec |
| $T_5$ | = 0.00 sec | $T_4$ | = 0.05 sec |

The output of the transfer function 96 defined in equation 1 was used to assign a value for the auto transformer's tap ratio as listed below in Table IV.

TABLE IV

| TAP RATIO VALUES |
|---|
| Tap Ratio = f(y(t)) where |
| $f(y(t)) = \begin{cases} 1.1, & y(t) \leq -.100 \\ 1.04, & -.100 < y(t) \leq -.040 \\ 1.02, & -.040 < y(t) \leq -.020 \\ 1.01, & -.020 < y(t) \leq -.010 \\ 1.005, & -.010 < y(t) \leq -.005 \\ 1.002, & -.005 < y(t) \leq -.002 \\ 1.000, & -.002 < y(t) < .002 \\ .998, & .002 \leq y(t) < .005 \\ .995, & .005 \leq y(t) < .010 \\ .990, & .010 \leq y(t) < .020 \\ .980, & .020 \leq y(t) < .040 \\ .960, & .040 \leq y(t) < .100 \\ .900, & .100 \leq y(t) \end{cases}$ |

The computer program used for the simulation models the electrical network in full three phase differential equation form. Thus, the instantaneous values of voltages and currents are available for inputs as if they were the raw signals from the potential transformers 20 and current transformers 22 shown in FIG. 1.

The lead lag compensation described in (1) was implemented digitally with a digital integration algorithm using a time step equal to the sampling period.

The algorithm referred to in the method step indicated by block 60b will now be described for the derivation of slip from sampled values of three phase voltages. Starting with three voltages $v_a$, $v_b$, $v_c$, and letting them be equal to $$v_a(t) = V_a \cos(\omega t + \delta) \quad \text{A.1}$$
$$v_b(t) = V_a \cos(\omega t + \delta - 2\pi/3) \quad \text{A.2}$$
$$v_c(t) = V_a \cos(\omega t + \delta + 2\pi/3) \quad \text{A.3}$$

Transform these quantities to alpha, beta, zero quantities to give $$v_o(t) = \tfrac{1}{3}(v_a + v_b + v_c) \quad \text{A.4}$$
$$v_\alpha(t) = \tfrac{1}{3}(2v_a - v_b - v_c) \quad \text{A.5}$$
$$v_\beta(t) = \sqrt{3}/3(v_b - v_c) \quad \text{A.6}$$

The zero sequence quantity is equal to zero for a balanced system. Because $v_o = 0$, then $v_b + v_c$ must equal to $-v_a$ giving $$v_\alpha(t) = v_a(t) = V_a \cos(\omega t + \delta) \quad \text{A.7}$$

Substituting A.2 and A.3 into A.6 and expanding the trigonometric functions for arguments of $\omega t + \delta$ and $2\pi/3$ gives $$v_\beta(t) = \sqrt{3}/3 \, V_a (\cos(\omega t + \delta)\cos 2\pi/3 + \sin(\omega t + \delta)\sin 2\pi/3 - \quad \text{A.8}$$

-continued
$$\cos(\omega t + \delta)\cos 2\pi/3 + \sin(\omega t + \delta)\sin 2\pi/3)$$

Combining like terms and recognizing that $\sin 2\pi/3$ is equal to $$\sqrt{3}/2 \text{ gives } v_\beta(t) = V_a \sin(\omega t + \delta) \quad \text{A.9}$$

The values of $v_\alpha$ and $v_\beta$ can be transformed into two quantities $v_{\alpha s}$ and $v_{\beta s}$ which are sinusoidal functions oscillating at slip frequency as in A.10.

$$\begin{bmatrix} v_{\alpha s}(t) \\ v_{\beta s}(t) \end{bmatrix} = \begin{bmatrix} \cos\omega_e t & \sin\omega_e t \\ -\sin\omega_e t & \cos\omega_e t \end{bmatrix} \begin{bmatrix} v_\alpha(t) \\ v_\beta(t) \end{bmatrix} \quad \text{A.10}$$

Substituting A.7 and A.9 into A.10, performing the multiplication, and using appropriate trigonometric identities gives $$v_{\alpha s}(t) = V_a \cos((\omega - \omega_e)t + \delta) \quad \text{A.11}$$

$$v_{\beta s}(t) = V_a \sin((\omega - \omega_e)t + \delta) \quad \text{A.12}$$

The values of $v_{\alpha s}(t+\Delta t)$ and $v_{\beta s}(t+\Delta t)$ are the following $$v_{\alpha s}(t + \Delta t) = V_a \cos((\omega - \omega_e)(t + \Delta t) + \delta) \quad \text{A.13}$$

$$v_{\beta s}(t + \Delta t) = V_a \sin((\omega - \omega_e)(t + \Delta t) + \delta) \quad \text{A.14}$$

Expanding these terms gives $$v_{\alpha s}(t + \Delta t) = V_a \cos((\omega - \omega_e)t + \delta)\cos(\omega - \omega_e)\Delta t - \quad \text{A.15}$$
$$V_a \sin((\omega - \omega_e)t + \delta)\sin(\omega - \omega_e)\Delta t$$

$$v_{\beta s}(t + \Delta t) = V_a \sin((\omega - \omega_e)t + \delta)\cos(\omega - \omega_e)\Delta t + \quad \text{A.16}$$
$$V_a \cos((\omega - \omega_e)t + \delta)\sin(\omega - \omega_e)\Delta t$$

Substituting A.11 and A.12 into equations A.15 and A.16 gives $$v_{\alpha s}(t + \Delta t) = v_{\alpha s}(t)\cos((\omega - \omega_e)\Delta t) - v_{\beta s}(t)\sin((\omega - \omega_e)\Delta t) \quad \text{A.17}$$

$$v_{\beta s}(t + \Delta t) = v_{\beta s}(t)\cos((\omega - \omega_e)\Delta t) + v_{\alpha s}(t)\sin((\omega - \omega_e)\Delta t) \quad \text{A.18}$$

Equations A.17 and A.18 can be expressed in matrix form giving $$\begin{vmatrix} v_{\alpha s}(t + \Delta t) \\ v_{\beta s}(t + \Delta t) \end{vmatrix} = \begin{vmatrix} v_{\alpha s}(t) & -v_{\beta s}(t) \\ v_{\beta s}(t) & v_{\alpha s}(t) \end{vmatrix} \begin{vmatrix} \cos(\omega - \omega_e)t \\ \sin(\omega - \omega_e)t \end{vmatrix} \quad \text{A.19}$$

Using Crammer's Rule to solve for $\sin(\omega - \omega_e)\Delta t$ and $\cos(\omega - \omega_e)\Delta t$ gives $$\cos(\omega - \omega_e)\Delta t = \frac{v_{\alpha s}(t + \Delta t)v_{\alpha s}(t) + v_{\beta s}(t + \Delta t)v_{\beta s}(t)}{v_{\alpha s}^2(t) + v_{\beta s}^2(t)} \quad \text{A.20}$$

$$\sin(\omega - \omega_e)\Delta t = \frac{v_{\beta s}(t + \Delta t)v_{\alpha s}(t) - v_{\alpha s}(t + \Delta t)v_{\beta s}(t)}{v_{\alpha s}^2(t) + v_{\beta s}^2(t)} \quad \text{A.21}$$

Note that the terms $\cos(\omega - \omega_e)\Delta t$ and $\sin(\omega - \omega_e)\Delta t$ are independent of the variable t, i.e. time, and they are functions of the differences in frequency and the time step $\Delta t$ which is set to one value equal to the sampling period. By taking the inverse trigonometric function and dividing by $\Delta t$ gives the difference in frequency. For small arguments $(\omega - \omega_e)\Delta t$ the algorithm for slip becomes:

$$(\omega - \omega_e) = \frac{1}{\Delta t} \frac{v_{\beta s}(t + \Delta t)v_{\alpha s}(t) + v_{\alpha s}(t + \Delta t)v_{\beta s}(t)}{v_{\alpha s}^2(t) + v_{\beta s}^2(t)}$$

Figure 10:
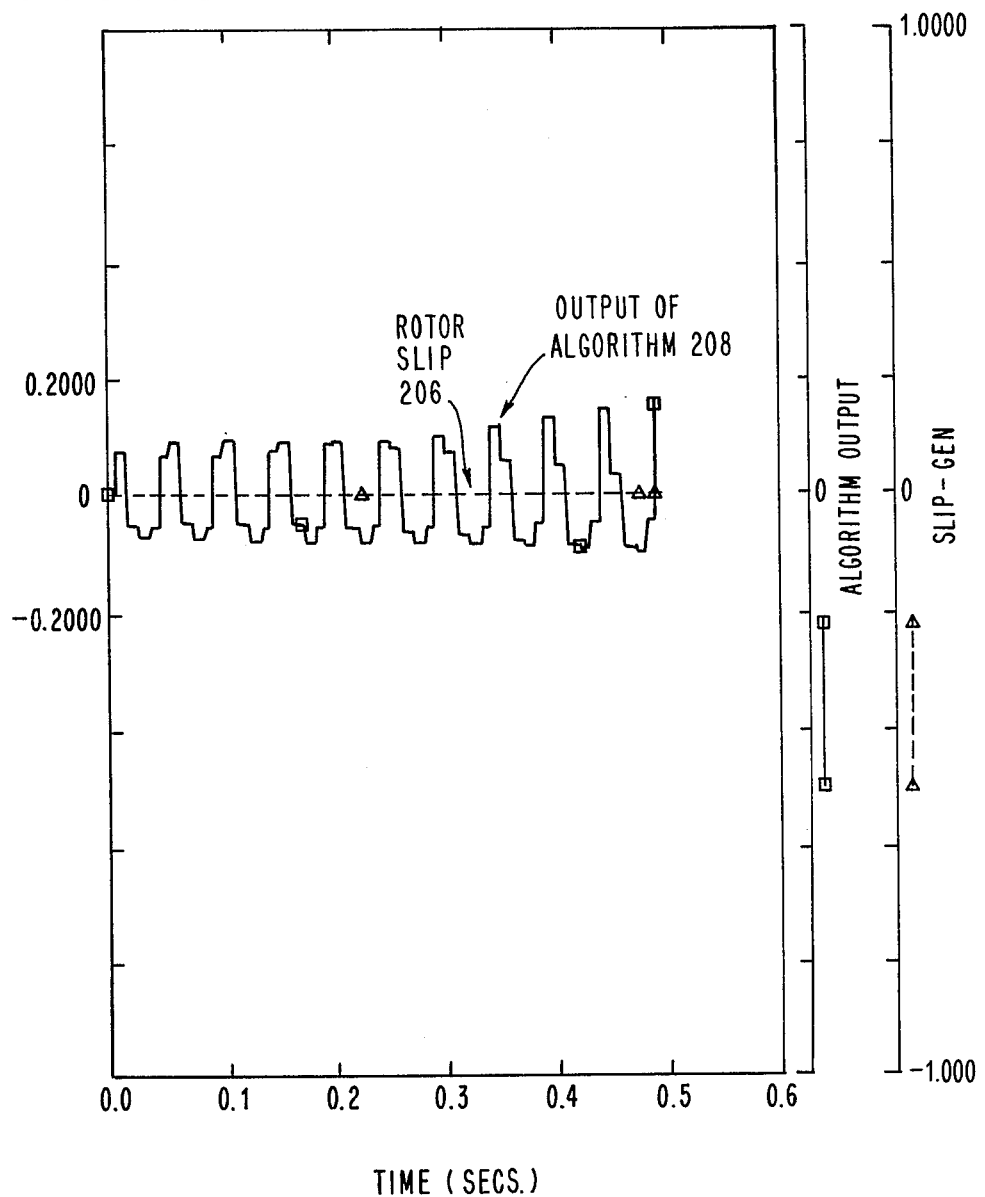
FIG. 10 is a graph showing the stabilizing signal output from the microprocessor in relation to the rotor slip where the slip algorithm or sampling rate is calculated every ten milliseconds.

The equations A.1–A.21 for the algorithm for derivation of slip were derived for positive sequence quantities. With system unbalances there is a mixture of positive, negative and zero sequence quantities. Zero sequence quantities are not a problem because the generator is connected on the delta side of the step up transformer and there is a high impedance placed on the generator's neutrals to ground. Negative sequence quantities can have undesired effects on the results from the slip computation algorithm. Runs were made for the condition of one phase open for the transmission line in FIG. 8. Using a sampling period of 10 milliseconds, the output of the frequency transducer is shown by line 208 in FIG. 10, as oscillating with growth in amplitude, symptomatic of a beat. More particularly, the rotor slip is indicated in FIG. 10 by the broken line 206 which is essentially constant at zero slip indicating normal speed and no deviation.

With a sampling period of 0.025 sec the oscillations do not appear. As shown in FIG. 11, the output 210 of the slip algorithm tracks the rotor slip 212 quite closely. Here, the output of the stabilizer is represented by the dotted line 214 indicating the tap ratio f(y(t)). The reason for this effect of the sampling rate is that the 0.025 sec time interval is equal to three cycles of 120 Hz produced by negative sequence. Thus, the error introduced by negative sequence is kept at a minimum if the time period is chosen as an odd number of periods of the 120 Hz oscillation.

Listed below is the program for the microprocessor 60 for carrying out the functions of the system elements described above and contained in the accelerating power signal digital processor 62 and the digital stabilizer signal generator 64. The program is carried out in a series III microprocessor program using Pascal language in a conventional computer, in this case an Intel 8080 series computer.

MICROPROCESSOR PROGRAM

```
SERIES III PASCAL-86, V1.0
SOURCE FILE: :F1:STAB1.P86
OBJECT FILE: F1:STAB1.OBJ
CONTROLS SPECIFIED: XREF, CHECK, PRINT(:LP:), TITLE(STAB1).
  STMT  LINE  NESTING  SOURCE TEXT: :F1:STAB1.P86
   1     1     0    0   PROGRAM STAB (INPUT,OUTPUT);
   2     2     0    0
```

-continued

MICROPROCESSOR PROGRAM

```
                              CONST
                              POWER←RATE←TIMEC=0.2;
 3    6    0    0             MACHINE←INERTA=9.0;
 4    7    0    0             FREQ←RATE←TIMEC=0.2;
 5    8    0    0             STABLIZER←GAIN=10.0;
 6    9    0    0             TCON1=0.25;
 7   10    0    0             TCON2=3.0;
 8   11    0    0             TCON3=0.25;
 9   12    0    0             TCON4=0.05;
10   13    0    0             FBASE=60.0;
11   14    0    0             XQ = 1.5
                              VAR
                              FREQUENCY,
                              COSWT,
                              SINWT,
                              VOLTAGEA,
                              VOLTAGEB,
                              VOLTAGEC,
                              VOLTAGECA,
                              VOLTAGEBC,
                              VOLTAGECAQ,
                              VOLTAGEBCQ,
                              GENIB,
                              GENIA,
                              VOLTAGE ALPHA,
                              VOLTAGE BETA,
                              QAXISVOLTAGE,
                              DAXISVOLTAGE,
                              POWER,
                              STATE1,
                              STATE2,
                              STATE3,
                              STATE4,
                              TAP,
                              TMAG,
                              INTERVAL,
                              DANG,
                              ACOS,
                              ASIN,
                              COS←NOW,
                              SIN←NOW,
                              VOLTAGEDL,
                              VOLTAGEQL,
                              A,
                              B,
                              PE,
                              DSTATE1,
                              DSTATE2,
                              DSTATE3,
                              DSTATE4,
                              SQRT3,
                              VOLTAGED,
                              VOLTAGEM,
                              VOLTAGEQ,
                              VOLTAGEAC:REAL;
12   61    0    0
                              PROCEDURE INITIALIZE;
13   64    1    0
                              BEGIN
13   66    1    1
                              FREQUENCY:=0;
14   68    1    1             COSWRT:=1;
15   69    1    1             SINWT:=0;
16   70    1    1             SQRT3;=1 / SQRT(3);
17   71    1    1             VOLTAGECA:=VOLTAGEC−VOLTAGEA;
18   72    1    1             VOLTAGEBC:=VOLTAGEB−VOLTAGEC;
19   73    1    1             VOLTAGECAQ:=VOLTAGECA+GENIB * XQ
20   74    1    1             VOLTAGEBCQ:=VOLTAGEBC+GENIA * XQ
21   75    1    1             VOLTAGE←ALPHA:=− (VOLTAGECAQ+VOLTAGEBCQ);
22   76    1    1             VOLTAGE←BETA:=(VOLTAGEBCQ−VOLTAGECAQ) * SQRT3;
23   77    1    1             VOLTAGED:=VOLTAGE←ALPHA;
24   78    1    1             VOLTAGEQ:=VOLTAGE←BETA;
25   79    1    1             VOLTAGEM:=SQRT(VOLTAGED*VOLTAGED+VOLTAGEQ*
                              VOLTAGEQ);
26   80    1    1             QAXISVOLTAGE:=VOLTAGEQ / VOLTAGEM;
27   81    1    1             DAXISVOLTAGE:=VOLTAGED / VOLTAGEM;
28   82    1    1
                              (* INITIALIZE POWER TRANSDUCER *)
                              POWER:=GENIB * VOLTAGEBC − GENIA * VOLTAGECA;
29   88    1    1
                              (* INITIALIZE THE CONTROLS *)
```

MICROPROCESSOR PROGRAM

| | | | | |
|---|---|---|---|---|
| | | | | STATE1:=0; |
| 30 | 94 | 1 | 1 | STATE2:=POWER; |
| 31 | 95 | 1 | 1 | STATE3:=0; |
| 32 | 96 | 1 | 1 | STATE4:=0; |
| 33 | 97 | 1 | 1 | TAP:=1 |
| | | | | END; |
| 34 | 99 | 0 | 0 | |
| | | | | PROCEDURE STABILIZE; |
| 35 | 102 | 1 | 0 | |
| | | | | BEGIN |
| 35 | 104 | 1 | 1 | |
| | | | | (* FREQUENCY TRANSDUCER *) |
| | | | | DANG:=FBASE*2.0*3.14592654*INTERVAL; |
| 36 | 109 | 1 | 1 | ACOS:=COS(DANG); |
| 37 | 110 | 1 | 1 | ASIN:=SIN(DANG); |
| 38 | 111 | 1 | 1 | |
| | | | | VOLTAGECAQ:=VOLTAGEC − VOLTAGEA + GENIB * XQ; |
| 39 | 113 | 1 | 1 | |
| | | | | VOLTAGEBCQ:=VOLTAGEB − VOLTAGEC + GENIA * XQ; |
| 40 | 117 | 1 | 1 | VOLTAGE←ALPHA:=−(VOLTAGECAQ + VOLTAGEBCQ); |
| 41 | 118 | 1 | 1 | VOLTAGE←BETA:=(VOLTAGEBCQ − VOLTAGECAQ) * SQRT3; |
| 42 | 119 | 1 | 1 | |
| | | | | COS←NOW:=COSWT * ACOS − SINWT * ASIN; |
| 43 | 124 | 1 | 1 | SIN←NOW:=COSWT * ASIN + SINWT * ACOS; |
| 44 | 125 | 1 | 1 | TMAG:=SQRT(COS←NOW * 2.0 + SIN NOW * 2.0); |
| 45 | 126 | 1 | 1 | COS←NOW:=COS←NOW / TMAG; |
| 46 | 127 | 1 | 1 | SIN←NOW:=SIN←NOW / TMAG; |
| 47 | 128 | 1 | 1 | VOLTAGED:=VOLTAGE ALPHA * COS←NOW + VOLTAGE←BETA * SIN←NOW; |
| 48 | 129 | 1 | 1 | VOLTAGEQ:=−VOLTAGE←ALPHA * SIN←NOW + VOLTAGE←BETA * COS←NOW; |
| 49 | 130 | 1 | 1 | VOLTAGEM:=SQRT(VOLTAGED * VOLTAGED + VOLTAGEQ * VOLTAGEQ); |
| 50 | 131 | 1 | 1 | VOLTAGED:=VOLTAGED / VOLTAGEM; |
| 51 | 132 | 1 | 1 | VOLTAGEQ:=VOLTAGEQ / VOLTAGEM; |
| 52 | 133 | 1 | 1 | VOLTAGEDL:=DAXISVOLTAGE; |
| 53 | 134 | 1 | 1 | VOLTAGEQL:=QAXISVOLTAGE; |
| 54 | 135 | 1 | 1 | FREQUENCY:=(VOLTAGEQ * VOLTAGEDL − VOLTAGEQL * VOLTAGED) / DANG; |
| 55 | 136 | 1 | 1 | QAXISVOLTAGE:=VOLTAGEQ; |
| 56 | 137 | 1 | 1 | DAXISVOLTAGE:=VOLTAGED; |
| 57 | 138 | 1 | 1 | COSWT:=COS←NOW; |
| 58 | 139 | 1 | 1 | SINWT:=SIN←NOW; |
| 59 | 140 | 1 | 1 | |
| | | | | (* POWER TRANSDUCER *) |
| | | | | VOLTAGEAC:=VOLTAGEA − VOLTAGEC; |
| 60 | 146 | 1 | 1 | VOLTAGEBC:=VOLTAGEB − VOLTAGEC; |
| 61 | 147 | 1 | 1 | PE:=GENIA * VOLTAGEAC + GENIB * VOLTAGEBC; |
| 62 | 148 | 1 | 1 | POWER:=POWER + 0.2 * (PE − POWER); |
| 63 | 149 | 1 | 1 | |
| | | | | (* STABILIZER CONTROLS *) |
| | | | | A:=FREQUENCY − STATE1; |
| 64 | 154 | 1 | 1 | DSTATE1:=A / POWER←RATE←TIMEC; |
| 65 | 155 | 1 | 1 | A:=A * MACHINE←INERTA / POWER←RATE←TIMEC; |
| 66 | 156 | 1 | 1 | B:=POWER − STATE2; |
| 67 | 157 | 1 | 1 | DSTATE2:=B / FREQ←RATE←TIMEC; |
| 68 | 158 | 1 | 1 | A:=(A−B)*STABILIZER←GAIN; |
| 69 | 159 | 1 | 1 | B:=A*TCON1/TCON2+STATE3; |
| 70 | 160 | 1 | 1 | DSTATE3:=(A−B)/TCON2; |
| 71 | 161 | 1 | 1 | A:=B*TCON3/TCON4+STATE4; |
| 72 | 162 | 1 | 1 | DSTATE4:=(B−A)/TCON4; |
| 73 | 163 | 1 | 1 | STATE1:=STATE1+INTERVAL*DSTATE1; |
| 74 | 164 | 1 | 1 | STATE2:=STATE2+INTERVAL*DSTATE2; |
| 75 | 165 | 1 | 1 | STATE3:=STATE3+INTERVAL*DSTATE3; |
| 76 | 166 | 1 | 1 | STATE4:=STATE4+INTERVAL*DSTATE4; |
| 77 | 167 | 1 | 1 | |
| | | | | (*SELECTOR TAP-CHANGER POSITION*) |
| | | | | IF A > 0.002 THEN |
| 78 | 171 | 1 | 1 | BEGIN |
| 78 | 172 | 1 | 2 | IF A < 0.005 THEN TAP:=2 |
| 79 | 173 | 1 | 2 | ELSE IF A < 0.01 THEN TAP:=3 |
| 81 | 174 | 1 | 2 | ELSE IF A < 0.02 THEN TAP:=4 |
| 83 | 175 | 1 | 2 | ELSE IF A < 0.04 THEN TAP:=5 |
| 85 | 176 | 1 | 2 | ELSE IF A < 0.10 THEN TAP:=6 |
| 87 | 177 | 1 | 2 | ELSE TAP:=7 |
| 88 | 178 | 1 | 2 | END |
| 89 | 179 | 1 | 2 | |
| | | | | ELSE IF A < − 0.002 THEN |
| 91 | 181 | 1 | 1 | BEGIN |
| 91 | 182 | 1 | 2 | IF A > −0.005 THEN TAP:=8 |

-continued

| | | | | MICROPROCESSOR PROGRAM |
|---|---|---|---|---|
| 92 | 183 | 1 | 2 | ELSE IF A > −0.01 THEN TAP:=9 |
| 94 | 184 | 1 | 2 | ELSE IF A > −0.02 THEN TAP:=10 |
| 96 | 185 | 1 | 2 | ELSE IF A > −0.04 THEN TAP:=11 |
| 98 | 186 | 1 | 2 | ELSE IF A > −0.10 THEN TAP:=12 |
| 100 | 187 | 1 | 2 | ELSE         TAP:=13 |
| 101 | 188 | 1 | 2 | END |
| 102 | 189 | 1 | 1 | |
| | | | | ELSE |
| 103 | 191 | 1 | 1 | |
| | | | | TAP:=1 |
| | | | | END; |
| 104 | 195 | 0 | 0 | |
| | | | | BEGIN |
| 104 | 197 | 0 | 1 | |
| | | | | INITIALIZE; |
| 105 | 199 | 0 | 1 | STABILIZE; |
| 106 | 200 | 0 | 1 | |
| | | | | END. |

| | | CROSS REFERENCE LISTING | |
|---|---|---|---|
| NAME | OFFSET | LENGTH | ATTRIBUTES AND REFERENCES |
| A | 3CH | 4 | REAL VARIABLE IN STAB AT 11; WRITE: 63 65 68 71; READ: 64 65 68 69 70 72 77 78 80 82 84 86 90 91 93 95 97 99. |
| ACOS | 54H | 4 | REAL VARIABLE IN STAB AT 11; WRITE: 36; READ: 42 43. |
| ASIN | 50H | 4 | REAL VARIABLE IN STAB AT 11; WRITE: 37; READ: 42 43. |
| B | 38H | 4 | REAL VARIABLE IN STAB AT 11; WRITE: 66 69; READ: 67 68 70 71 72. |
| COS | | | PREDEFINED REAL FUNCTION; READ: 36. |
| COSWT | B4H | 4 | REAL VARIABLE IN STAB AT 11; WRITE: 14 57; READ: 42 43. |
| COS←NOW | 4CH | 4 | REAL VARIABLE IN STAB AT 11; WRITE: 42 45; READ: 44 45 47 48 57. |
| DANG | 58H | 4 | REAL VARIABLE IN STAB AT 11; WRITE: 35; READ: 36 37 54. |
| DAXISVOLTAGE | 7CH | 4 | REAL VARIABLE IN STAB AT 11; WRITE: 27 56; READ: 52. |
| DSTATE1 | 30H | 4 | REAL VARIABLE IN STAB AT 11; WRITE: 64; READ: 73. |
| DSTATE2 | 2CH | 4 | REAL VARIABLE IN STAB AT 11; WRITE: 67; READ: 74. |
| DSTATE3 | 28H | 4 | REAL VARIABLE IN STAB AT 11; WRITE: 70; READ: 75. |
| DSTATE4 | 24H | 4 | REAL VARIABLE IN STAB AT 11; WRITE: 72; READ: 76. |
| FBASE | | 10 | REAL CONSTANT IN STAB AT 10; READ: 35. |
| FREQUENCY | B8H | 4 | REAL VARIABLE IN STAB AT 11; WRITE: 13 54; READ: 63. |
| FREQ←RATE←TIMEC | | 10 | REAL CONSTANT IN STAB AT 4; READ: 67. |
| GENIA | 8CH | 4 | REAL VARIABLE IN STAB AT 11; READ: 20 28 39 61. |
| GENIB | 90H | 4 | REAL VARIABLE IN STAB AT 11; READ: 19 28 38 61. |
| INITIALIZE | | | PROCEDURE IN STAB AT 12; READ: 104. |
| INTERVAL | 5CH | 4 | REAL VARIABLE IN STAB AT 11; READ: 35 73 74 75 76. |
| MACHINE INERTA | | 10 | REAL CONSTANT IN STAB AT 3; READ: 65. |
| PE | 34H | 4 | REAL VARIABLE IN STAB AT 11; WRITE: 61; READ: 62. |
| POWER | 78H | 4 | REAL VARIABLE IN STAB AT 11; WRITE: 28 62; READ: 30 62 62 66. |
| POWER←RATE←TIMEC | | 10 | REAL CONSTANT IN STAB AT 2; READ: 64 65. |
| QAXISVOLTAGE | 80H | 4 | REAL VARIABLE IN STAB AT 11; WRITE: 26 55; READ: 53. |
| REAL | | 4 | PRIMITIVE TYPE; READ: 11. |
| SIN | | | PREDEFINED REAL FUNCTION; |

-continued
CROSS REFERENCE LISTING

| | | | |
|---|---|---|---|
| | | | READ: 37. |
| SINWT | B0H | 4 | REAL VARIABLE IN STAB AT 11; WRITE: 15 58; READ: 42 43. |
| SIN←NOW | 48H | 4 | REAL VARIABLE IN STAB AT 11; WRITE: 43 46; READ: 44 46 47 48 58. |
| SQRT3 | 20H | 4 | REAL VARIABLE IN STAB AT 11; WRITE: 16; READ: 22 41. |
| STABILIZE | | | PROCEDURE IN STAB AT 34; READ: 105. |
| STABILIZER←GAIN | | 10 | REAL CONSTANT IN STAB AT 5; READ: 68. |
| STATE1 | 74H | 4 | REAL VARIABLE IN STAB AT 11; WRITE: 29 73; READ: 63 73. |
| STATE2 | 70H | 4 | REAL VARIABLE IN STAB AT 11; WRITE: 30 74; READ: 66 74. |
| STATE3 | 6CH | 4 | REAL VARIABLE IN STAB AT 11; WRITE: 31 75; READ: 69 75. |
| STATE4 | 68H | 4 | REAL VARIABLE IN STAB AT 11; WRITE: 32 76; READ: 71 76. |
| TAP | 64H | 4 | REAL VARIABLE IN STAB AT 11; WRITE: 33 79 81 83 85 87 88 92 94 96 98 100 101 103. |
| TCON1 | | 10 | REAL CONSTANT IN STAB AT 6; READ: 69. |
| TCON2 | | | REAL CONSTANT IN STAB AT 7; READ: 69 70. |
| TCON3 | | 10 | REAL CONSTANT IN STAB AT 8; READ: 71. |
| TCON4 | | 10 | REAL CONSTANT IN STAB AT 9; READ: 71 72. |
| TMAG | 60H | 4 | REAL VARIABLE IN STAB AT 11; WRITE: 44; READ: 45 46. |
| VOLTAGEA | ACH | 4 | REAL VARIABLE IN STAB AT 11; READ: 17 38 59. |
| VOLTAGEAC | 10H | 4 | REAL VARIABLE IN STAB AT 11; WRITE: 59; READ: 61. |
| VOLTAGEB | A8H | 4 | REAL VARIABLE IN STAB AT 11; READ: 18 39 60. |
| VOLTAGEBC | 9CH | 4 | REAL VARIABLE IN STAB AT 11; WRITE: 18 60; READ: 20 28 61. |
| VOLTAGEBCQ | 94H | 4 | REAL VARIABLE IN STAB AT 11; WRITE: 20 39; READ: 21 22 40 41. |
| VOLTAGEC | A4H | 4 | REAL VARIABLE IN STAB AT 11; READ: 17 18 38 59 60. |
| VOLTAGECA | A0H | 4 | REAL VARIABLE IN STAB AT 11; WRITE: 17; READ: 19 28. |
| VOLTAGECAQ | 98H | 4 | REAL VARIABLE IN STAB AT 11; WRITE: 19 38; READ: 21 22 40 41. |
| VOLTAGED | 1CH | 4 | REAL VARIABLE IN STAB AT 11; WRITE: 23 47 50; READ: 25 25 27 49 49 50 54 56. |
| VOLTAGEDL | 44H | 4 | REAL VARIABLE IN STAB AT 11; WRITE: 52; READ: 54. |
| VOLTAGEM | 18H | 4 | REAL VARIABLE IN STAB AT 11; WRITE: 25 49; READ: 26 27 50 51. |
| VOLTAGEQ | 14H | 4 | REAL VARIABLE IN STAB AT 11; WRITE: 24 48 51; READ: 25 25 26 49 49 51 54 55. |
| VOLTAGEQL | 40H | 4 | REAL VARIABLE IN STAB AT 11; WRITE: 53; READ: 54. |
| VOLTAGE←ALPHA | 88H | 4 | REAL VARIABLE IN STAB AT 11; WRITE: 21 40; READ: 23 47 48. |
| VOLTAGE←BETA | 84H | 4 | REAL VARIABLE IN STAB AT 11; WRITE: 22 41; READ: 24 47 48. |

SUMMARY INFORMATION:

| PROCEDURE | OFFSET | CODE | SIZE | DATA | SIZE | STACK | SIZE |
|---|---|---|---|---|---|---|---|
| INITIALIZE | 00A7H | 0186H | 390D | | | 0006H | 6D |
| STABILIZE | 022DH | 05DFH | 1503D | | | 0008H | 8D |
| STAB | 080CH | 007FH | 127D | 00BCH | 188D | 000EH | 14D |
| TOTAL | | 088BH | 2187D | 00BCH | 188D | 0050H | 80D |

202 LINES READ.
0 ERRORS DETECTED.
45% UTILIZATION OF MEMORY.

While the invention has been described above with respect to its preferred embodiments, it should be understood that other forms and embodiments may be made without departing from the spirit and scope of the invention.

What is claimed is:

1. System for stabilizing a synchronous machine through excitation control to dampen out the machine oscillations by direct modulation of the voltage fed back to an automatic voltage regulator, comprising current and potential transformer means for obtaining a measure of terminal current and voltage of said synchronous machine;

analog to digital conversion means for sampling the values of A.C. voltages and currents on said potential and current transformer means to obtain instantaneous values of sampled voltage and current, and for converting said sampled values into digitized form;

accelerating power signal processing means responsive to said instantaneous values of voltage and current for deriving values of inferred measure of the accelerating power of said synchronous machine, said accelerating power signal processing means including slip frequency deriving means, responsive to said instantaneous values of voltage, to develop values of slip frequency of said voltage in relation to the rated frequency of said machine;

a stabilizer signal generator means responsive to said values of inferred measure of accelerating power for producing digital stabilizer signals corresponding to said values of accelerating power; and autotransformer means connected between said stabilizer signal generator means and said automatic voltage regulator, including solid state tap switching means responsive to said digital stabilizer signals for selecting the taps on said autotransformer and thereby controlling and modulating its output to said automatic voltage regulator in synchronism with the rate of sampling of said voltages and currents;

whereby damping of machine oscillations is provided by calculation of the accelerating power through the voltage and current values, and calculation of the rotor slip from the present and past computed values of internal voltage to effect the solid state switching of autotransformer taps to said automatic voltage regulator.

2. System as recited in claim 1, wherein said accelerating power signal processing means comprises:

instantaneous power compute means responsive to said instantaneous values of voltage and current for computing the instantaneous power output of said machine; and an accelerating power compute unit responsive to both said slip frequency deriving means and said instantaneous power compute means for calculating values of the accelerating power of said machine.

3. System as recited in claim 2, wherein said instantaneous power compute means combines the instantaneous values of three phase voltages derived from said sampled voltages with the sampled current values to calculate the instantaneous three phase power.

4. System as recited in claim 1, wherein said accelerating power compute unit comprises first memory means for storing values of slip frequency developed in said slip frequency deriving means, second memory means for storing values of instantaneous electrical power output of said machine, and mechanical power computing means, responsive to said first and second memory means, for computing the mechanical power output of said machine, an adder means for subtracting said values of instantaneous electrical power from said computed mechanical power to derive said inferred measure of the accelerating power of said synchronous machine.

5. System as recited in claim 1, wherein said slip frequency deriving means includes a digital algorithm which derives the value of slip frequency from sampled values of three phase voltages.

6. System as recited in claim 1, wherein said accelerating power signal processing means includes first means for storing digital values representing a machine rotor speed, second means for storing digital values representing digital values of slip frequency of said sampled voltage values in relation to the rated frequency of said machine, third means for storing digital values of the instantaneous electrical power output of said machine, and means for combining the information stored in said first second and third storing means to calculate inferred values of the accelerating power of said machine.

7. System as recited in claim 6 further comprising means responsive to the values stored in said second means for storing slip frequency for computing values representing the mechanical power output of said synchronous machine, and said combining means comprises an adder for subtracting the value of said instantaneous power stored in said third storing means from said computed value of mechanical power to thereby derive said inferred measure of accelerating power of said synchronous machine.

8. System as recited in claim 1, wherein said stabilizer signal generator means includes algorithm means for applying a transfer function of machine parameters and operating constants to said values of accelerating power to derive said digital stabilizer signals.

9. System as recited in claim 8 further comprising phase lead compensation means applied to said algorithm means to produce said stabilizing signal.

10. System as recited in claim 8, wherein said algorithm means presents a discrete sampled data approximation to an analog transfer function operating on the inferred accelerating power of the type:

$$\frac{y(s)}{P'_A(s)} = \frac{K(1 + sT_1)(1 + sT_3)}{(1 + sT_2)(1 + sT_4)(1 + sT_5)}$$

wherein $P'_A(s)$ is the inferred accelerating power; $y(s)$ is a function of the autotransformer tap ratio; and $T_1$, $T_2$, $T_3$, $T_4$ and $T_5$ are stabilizer transfer function time parameters.

11. System as recited in claim 1, wherein said stabilizer signal generator means includes a autotransformer tap selector switch decoder for converting said stabilizer signal into a digitally coded output to said switching means of said autotransformer means.

12. System as recited in claim 11, wherein said autotransformer tap switching means comprises a plurality of optically isolated switches connected to a plurality of taps on the windings of said autotransformer, each of said switches being connected to a respective digital output line of said tap selector switch decoder whereby the digitally coded output of said tap selector switch decoder will cause the appropriate connection of said output lines to a selected tap.

13. Method for stabilizing a synchronous machine through excitation control to dampen out the machine oscillations by direct modulation of the voltage fed back to an automatic voltage regulator, comprising:

providing current and potential transformer means at the output of said machine for obtaining a measure of terminal current and voltage of said synchronous machine;

sampling the output voltages and current on said potential and voltage transformer means to obtain instantaneous, digital values of sampled voltage and current, and converting said sampled values into digitized form;

processing said instantaneous values of voltage and current for deriving values representing an inferred measure of the accelerating power of said synchronous machine including the steps of developing values of slip frequency of said voltage in relation to the rated frequency of said machine, combining said intantaneous values of voltage and current for computing the instantaneous power output of said machine, and combining values of said slip frequency and said instantaneous power for calculating values of the accelerating power of said machine; converting said values of inferred measure of accelerating power into a form used as a digital stabilizer signal; and applying said digital stabilizer signal to an autotransformer tap switching means for selecting the taps on said autotransformer and thereby controlling and modulating its output to said automatic voltage regulator in synchronism with the rate of sampling of said voltages and currents;

whereby damping of machine oscillations is provided by calculation of accelerating power to compensate for phase lags in the excitation control.

14. Method as recited in claim 13, wherein said step of developing values of slip frequency includes the use of a digital algorithm which derives the value of slip frequency from sampled values of three phase voltages.

15. Method as recited in claim 13, where said instantaneous power is computed by combining the instantaneous values of three phase voltages derived from said sampled voltages with the sampled current values.

16. Method as recited in claim 13, wherein said step of processing said instantaneous values of voltage and current comprise the steps of:

storing digital values representing digital values of of said values of slip frequency of said sampled voltage values in relation to the rated frequency of said machine;

storing digital values of the instantaneous electrical power output of said machine; and calculating inferred values in digital form of said accelerating power of said machine from said stored values.

17. Method as recited in claim 16, wherein said step of calculating accelerating power includes:

combining the digital values stored relating to rotor speed and slip frequency to compute values representing the mechanical power output of said synchronous machine; and subtracting the digital value of said instantaneous electrical power from said computed digital value of mechanical power to thereby derive said inferred measure of accelerating power of said synchronous machine.

* * * * *